(12) United States Patent
Yamazaki et al.

(10) Patent No.: US 8,986,870 B2
(45) Date of Patent: Mar. 24, 2015

(54) POWER STORAGE DEVICE

(75) Inventors: Shunpei Yamazaki, Tokyo (JP); Konami Izumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 603 days.

(21) Appl. No.: 12/719,629

(22) Filed: Mar. 8, 2010

(65) Prior Publication Data
US 2010/0227228 A1    Sep. 9, 2010

(30) Foreign Application Priority Data
Mar. 9, 2009    (JP) .................................. 2009-054519

(51) Int. Cl.
*H01M 2/18* (2006.01)
*H01M 4/02* (2006.01)
(Continued)

(52) U.S. Cl.
CPC .............. *H01G 9/058* (2013.01); *H01G 9/016* (2013.01); *H01G 9/02* (2013.01); *H01G 9/038* (2013.01); *H01G 9/155* (2013.01); *H01G 11/26* (2013.01); *H01G 11/28* (2013.01); *H01G 11/52* (2013.01); *H01G 11/68* (2013.01); *H01M 4/13* (2013.01); *H01M 4/366* (2013.01); *H01M 10/052* (2013.01); *H01G 11/24* (2013.01); *H01G 11/60* (2013.01); *H01M 2/16* (2013.01); *H01M 4/661* (2013.01); *H01M 10/0525* (2013.01);
(Continued)

(58) Field of Classification Search
USPC .......... 429/129, 130, 131, 133, 136, 137, 138, 429/142, 143, 146, 147, 209, 233, 234, 246, 429/247, 249, 253, 254, 255; 29/623.5
See application file for complete search history.

(56) References Cited

U.S. PATENT DOCUMENTS 5,641,591 A * 6/1997 Kawakami et al. ........ 429/231.5
7,147,971 B2   12/2006 Okamoto et al.
(Continued)

FOREIGN PATENT DOCUMENTS

CN    101356670 A    1/2009
EP    0693792 A    1/1996
(Continued)

OTHER PUBLICATIONS

Chinese Office Action (Application No. 201010143783.0) Dated Oct. 15, 2013, with English Translation.

*Primary Examiner* — Carlos Barcena
(74) *Attorney, Agent, or Firm* — Fish & Richardson P.C.

(57) ABSTRACT

The present invention relates to a power storage device including: a positive electrode having a positive-electrode current collector, a positive-electrode active material with a plurality of first projections on the positive-electrode current collector, and a first insulator on an end of each of the plurality of first projections; a negative electrode having a negative-electrode current collector, a negative-electrode active material with a plurality of second projections on a surface of the negative-electrode current collector, and a second insulator on an end of each of the plurality of second projections; a separator between the positive electrode and the negative electrode; and an electrolyte provided in a space between the positive electrode and the negative electrode and containing carrier ions. In each of the first projections and the second projections, a ratio of the height to the width is 3 or more and 1000 or less to 1, i.e. (3 to 1000):1.

22 Claims, 4 Drawing Sheets

(51) Int. Cl.

| | | |
|---|---|---|
| *H01G 9/04* | (2006.01) |
| *H01G 9/008* | (2006.01) |
| *H01G 9/02* | (2006.01) |
| *H01G 9/022* | (2006.01) |
| *H01G 9/00* | (2006.01) |
| *H01G 11/26* | (2013.01) |
| *H01G 11/28* | (2013.01) |
| *H01G 11/52* | (2013.01) |
| *H01G 11/68* | (2013.01) |
| *H01M 4/13* | (2010.01) |
| *H01M 4/36* | (2006.01) |
| *H01M 10/052* | (2010.01) |
| *H01G 11/24* | (2013.01) |
| *H01G 11/60* | (2013.01) |
| *H01M 2/16* | (2006.01) |
| *H01M 4/66* | (2006.01) |
| *H01M 10/0525* | (2010.01) |
| *H01M 10/0566* | (2010.01) |
| *H01M 10/0569* | (2010.01) |

(52) U.S. Cl.
CPC ....... *H01M10/0566* (2013.01); *H01M 10/0569* (2013.01); *H01M 2004/021* (2013.01); *H01M 2300/0025* (2013.01); *Y02E 60/122* (2013.01); *Y02E 60/13* (2013.01)
USPC ............ 429/130; 429/146; 429/209; 429/233

(56) References Cited

U.S. PATENT DOCUMENTS

| | | | |
|---|---|---|---|
| 7,235,330 | B1 | 6/2007 | Fujimoto et al. |
| 7,432,010 | B2 | 10/2008 | Dokko |
| 7,521,151 | B2 | 4/2009 | Hwang et al. |
| 7,592,099 | B2 | 9/2009 | Tamura et al. |
| 8,110,307 | B2 | 2/2012 | Iwamoto |
| 2002/0102464 | A1 | 8/2002 | Yoshida et al. |
| 2002/0122985 | A1 | 9/2002 | Sato et al. |
| 2007/0059584 | A1 | 3/2007 | Nakano et al. |
| 2008/0297981 | A1 | 12/2008 | Endo et al. |
| 2009/0104515 | A1 | 4/2009 | Fujikawa et al. |
| 2010/0003599 | A1 | 1/2010 | Nonoshita et al. |
| 2010/0040951 | A1 | 2/2010 | Yamamoto |
| 2010/0209784 | A1 | 8/2010 | Yamazaki et al. |

FOREIGN PATENT DOCUMENTS

| | | |
|---|---|---|
| EP | 1978580 A1 | 10/2008 |
| EP | 2124273 A1 | 11/2009 |
| JP | 61-097910 A | 5/1986 |
| JP | 07-074057 A | 3/1995 |
| JP | 08-088022 A | 4/1996 |
| JP | 11054383 A | 2/1999 |
| JP | 2002025540 A | 1/2002 |
| JP | 2002260635 A | 9/2002 |
| JP | 2002-289174 A | 10/2002 |
| JP | 2003212529 A | 7/2003 |
| JP | 2003317707 A | 11/2003 |
| JP | 2004220926 A | 8/2004 |
| JP | 2005-019156 A | 1/2005 |
| JP | 2005-116248 A | 4/2005 |
| JP | 2005101409 A | 4/2005 |
| JP | 2005-149891 A | 6/2005 |
| JP | 2006059558 A | 3/2006 |
| JP | 2007095590 A | 4/2007 |
| JP | 2007-299580 A | 11/2007 |
| JP | 2008243888 A | 10/2008 |
| JP | 2008244210 A | 10/2008 |
| JP | 2008-294314 A | 12/2008 |
| JP | 2008309651 A | 12/2008 |
| JP | 2009021449 A | 1/2009 |
| WO | WO2008/111315 A1 | 9/2008 |

\* cited by examiner

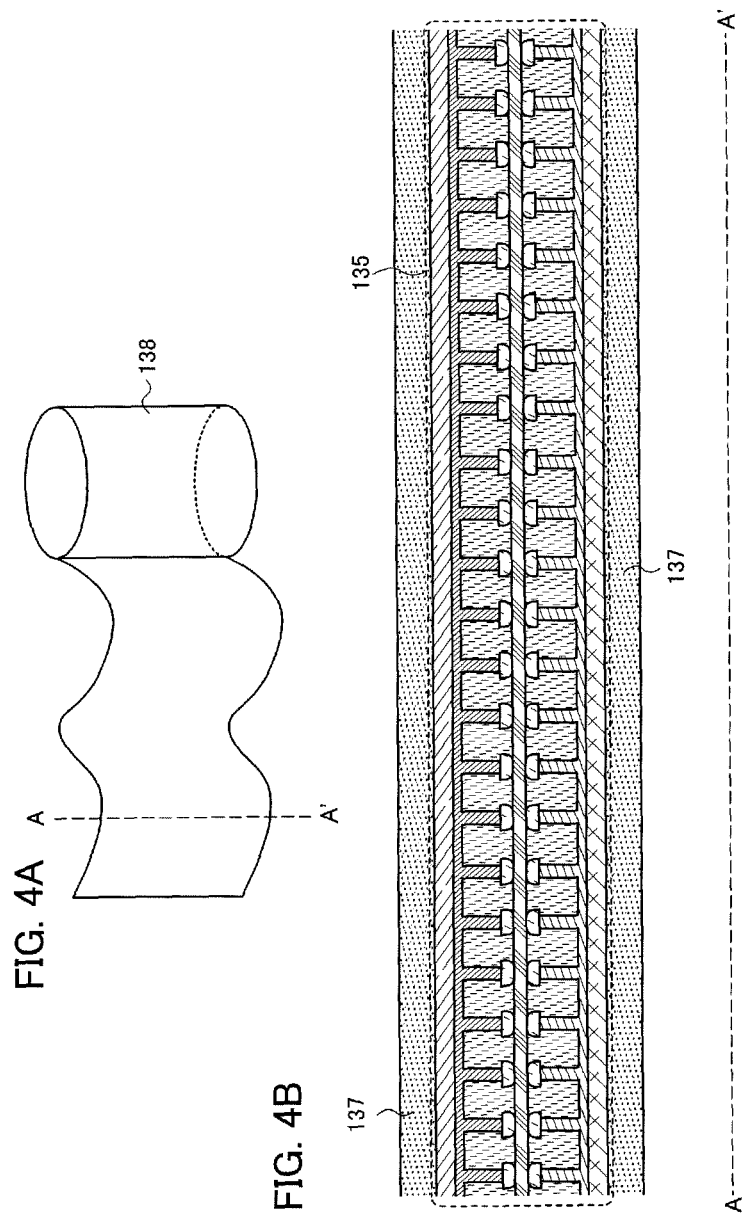

POWER STORAGE DEVICE

BACKGROUND OF THE INVENTION

1. Field of the Invention

The invention disclosed in this specification relates to power storage devices.

2. Description of the Related Art

In recent years, power storage devices, such as lithium-ion secondary batteries, which are power storage devices where carbon or lithium metal oxide is used as a battery material and which are charged and discharged by the movement of lithium ions as carrier ions between a positive electrode and a negative electrode, and electrochemical capacitors, have been actively developed (see References 1 to 3).

REFERENCES

[Reference 1] Japanese Published Patent Application No. 2008-294314
[Reference 2] Japanese Published Patent Application No. 2002-289174
[Reference 3] Japanese Published Patent Application No. 2007-299580

SUMMARY OF THE INVENTION

In order to obtain a power storage device with high capacity, the surface areas of a positive electrode and a negative electrode should be increased. The surface areas of a positive electrode and a negative electrode can be increased by providing a surface of each of the positive electrode and the negative electrode with projections and depressions.

A high-capacity power storage device can be obtained by interposing a separator between a positive electrode and a negative electrode having projections and depressions and by providing an electrolyte between the positive electrode and the negative electrode.

However, the positive or negative electrode may expand due to charging, and with that pressure, the separator may be broken and defective short circuit may be caused.

In addition, if pressure is applied to a separator between a positive electrode and a negative electrode in a thin, small-sized power storage device, the separator may easily be broken.

In the present invention, a surface of each of a positive-electrode active material and a negative-electrode active material is provided with a plurality of projections, and on an end of each of the projections, an insulator is disposed to relieve pressure that is to be applied to a separator.

An embodiment of the present invention relates to a power storage device including: a positive electrode having a positive-electrode current collector, a positive-electrode active material with a plurality of first projections on the positive-electrode current collector, and a first insulator on an end of each of the plurality of first projections; a negative electrode having a negative-electrode current collector, a negative-electrode active material with a plurality of second projections on the negative-electrode current collector, and a second insulator on an end of each of the plurality of second projections; a separator between the positive electrode and the negative electrode; and an electrolyte provided in a space between the positive electrode and the negative electrode and containing carrier ions. In each of the first projections and the second projections, a ratio of the height to the width is 3 or more and 1000 or less to 1, i.e. (3 to 1000):1.

Each of the first insulator and the second insulator may be any one of, or a stacked layer of two or more of, an acrylic resin, a polyimide resin, a polyimide amide resin, a phenol resin, an epoxy resin, a resist, a silicon oxide film, a silicon oxide film containing nitrogen, a silicon nitride film containing oxygen, and a silicon nitride film.

The carrier ions may be alkali metal ions or alkaline earth metal ions. The alkali metal ions may be lithium (Li) ions or sodium (Na) ions, and the alkaline earth metal ions may be magnesium (Mg) ions or calcium (Ca) ions.

Because the surface of each of the positive-electrode active material and the negative-electrode active material is provided with the plurality of projections, the surface area is increased and a thin, small-sized power storage device with high capacity can be obtained.

Furthermore, because the insulator is provided on each of the plurality of projections, even when pressure is applied between the positive electrode and the negative electrode, the insulator absorbs or disperses the pressure so as to prevent breaking of the separator. Accordingly, a highly reliable power storage device can be obtained.

BRIEF DESCRIPTION OF THE DRAWINGS

FIGS. 4A and 4B are a perspective view and a cross-sectional view of a power storage device.

DETAILED DESCRIPTION OF THE INVENTION

Figure 1:
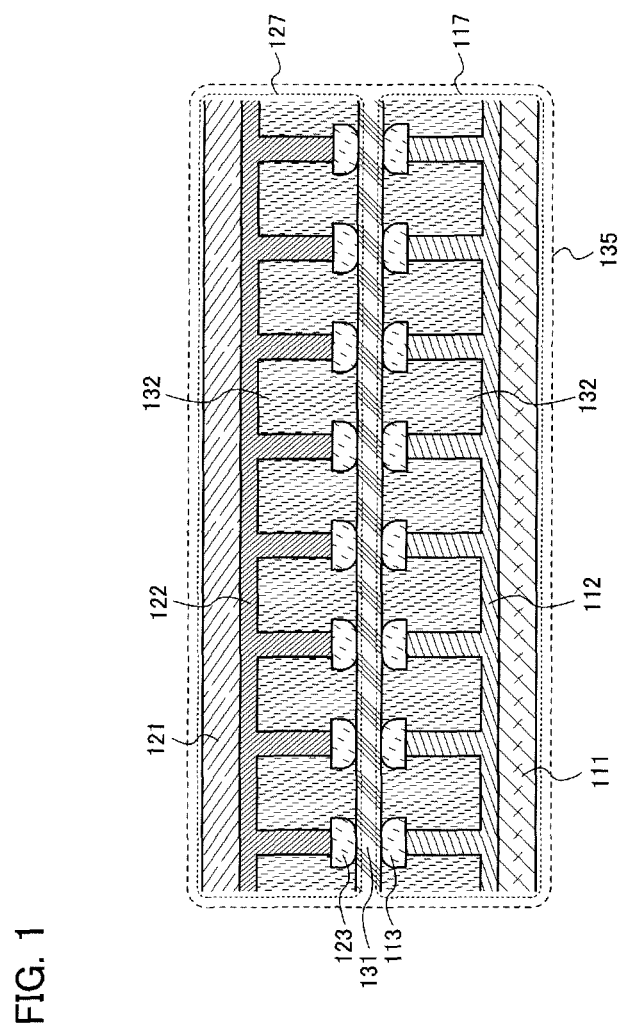
FIG. 1 is a cross-sectional view illustrating a manufacturing process of a power storage device.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the invention disclosed in this specification should not be interpreted as being limited to the description in the embodiments. Note that in the accompanying drawings, the same portions or portions having similar functions are denoted by the same reference numerals, and repetitive description thereof is omitted.

[Embodiment 1]

This embodiment is described with reference to FIG. 1, FIGS. 2A to 2D, FIGS. 3A to 3D, and FIGS. 4A and 4B.

Figure 2A:
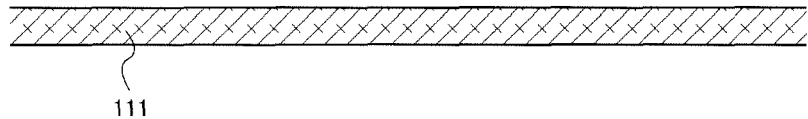
FIGS. 2A to 2D are cross-sectional views illustrating a manufacturing process of a power storage device.

First, a plate-like positive-electrode current collector 111 is prepared (see FIG. 2A). As the positive-electrode current collector 111, a simple substance, such as aluminum (Al) or titanium (Ti), or a compound thereof may be used.

Figure 2B:
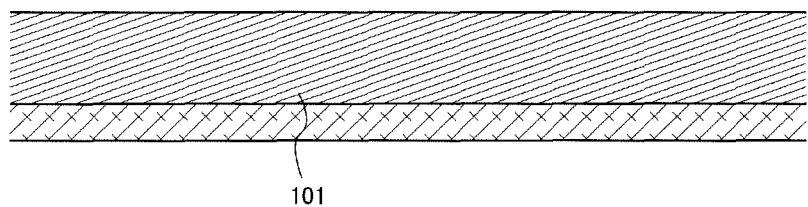

Next, a plate-like positive-electrode active material 101 which is a material of a positive-electrode active material 112 is formed over the positive-electrode current collector 111 (see FIG. 2B).

As the plate-like positive-electrode active material 101, a metal compound (oxide, sulfide, or nitride) having a layered structure can be used. In addition, as the positive-electrode active material 112 for a capacitor, activated carbon can be used. Furthermore, as the positive-electrode active material 112 for a lithium-ion secondary battery where lithium ions are used as carrier ions, a lithium-containing composite oxide represented by a chemical formula $Li_xM_yO_2$ (note that M represents Co, Ni, Mn, V, Fe, or Ti, and x is in the range of from 0.2 to 2.5 and y is in the range of from 0.8 to 1.25), such as $LiCoO_2$ or $LiNiO_2$, may be used. Note that in the case where the aforementioned lithium-containing composite oxide represented by the chemical formula $Li_xM_yO_2$ is used as the positive-electrode active material 112 of a lithium-ion secondary battery, M may include either one element or two or more elements. In other words, as the positive-electrode active material 112 of a lithium-ion secondary battery, a multi-element, lithium-containing composite oxide may be used.

Figure 2C:
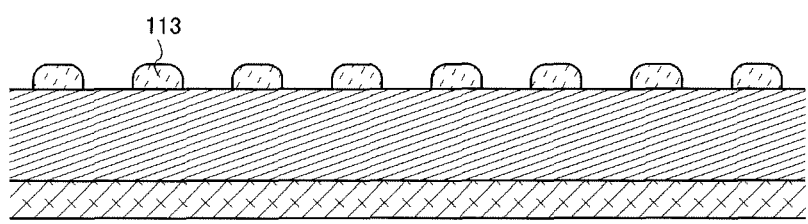

Over the plate-like positive-electrode active material 101, a plurality of insulators 113 serving as a mask in an etching step are formed (see FIG. 2C).

Examples of the insulators 113 include organic resins such as an acrylic resin, a polyimide resin, a polyimide amide resin, a phenol resin, an epoxy resin, and a resist. The insulators 113 may be formed with such an organic resin by a printing method, a spin-coating method, or the like. For example, the insulators 113 may be formed as follows: unexposed photosensitive acrylic is formed over a surface of the plate-like positive-electrode active material 101 by a printing method and regions where the insulators 113 are to be formed are exposed to light.

Alternatively, an inorganic insulating material, such as a silicon oxide film, a silicon oxide film containing nitrogen, a silicon nitride film containing oxygen, or a silicon nitride film, may be used for the insulators 113.

Further alternatively, a single layer of the aforementioned organic resin or inorganic insulating material, a stacked layer of two or more of the organic resins or a stacked layer of two or more of the inorganic insulating materials, or a stacked layer of two or more of the organic resins and the inorganic insulating materials may be used for the insulators 113.

Figure 2D:
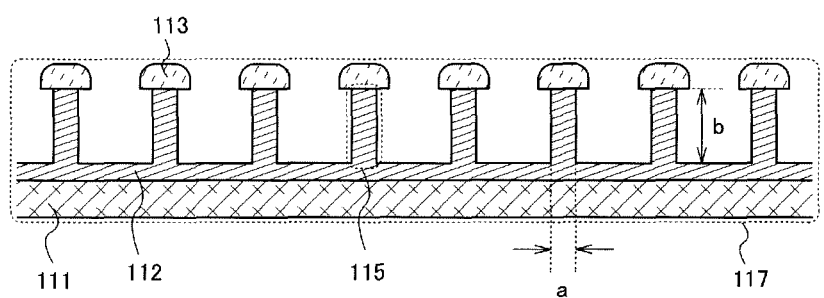

Next, with the use of the insulators 113 as a mask, the plate-like positive-electrode active material 101 is anisotropically etched by a dry etching method. Accordingly, the positive-electrode active material 112 is formed, which includes a plurality of projections 115 in which a ratio of height b to width a is 3 or more and 1000 or less to 1, i.e. (3 to 1000):1, preferably 10 or more and 1000 or less to 1, i.e. (10 to 1000):1. For example, each of the projections 115 has a width a of 1 μm to 10 μm and a height b of 3 μm to 1000 μm, preferably, a width a of 1 μm to 10 μm and a height b of 10 μm to 100 μm, or a width a of 1 μm and a height b of 10 μm (see FIG. 2D). FIG. 2D is a cross-sectional view, in which the positive-electrode active material 112 is illustrated as having a comb-like shape. However, the projections 115 are also formed in rows behind those illustrated, and thus, the positive-electrode active material 112 has a shape like a pin frog (spikes).

In the case of using a plate-like positive-electrode active material 101 which is difficult to etch by dry etching, the projections 115 may be formed by a different method such as mechanical processing, screen printing, electroplating, or hot embossing. Even in the case of using a plate-like positive-electrode active material 101 which can be etched by dry etching, the projections 115 may be formed by any of these methods.

In the above manner, a positive electrode 117 is formed. On the other hand, a plate-like negative-electrode current collector 121 is prepared (see FIG. 3A). As the negative-electrode current collector 121, a simple substance, such as copper (Cu), aluminum (Al), nickel (Ni), or titanium (Ti), or a compound thereof may be used.

Figure 3A:
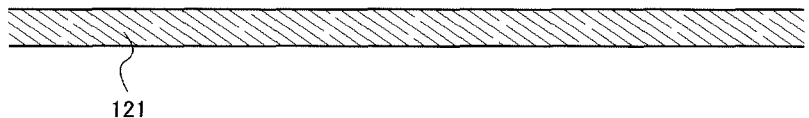
FIGS. 3A to 3D are cross-sectional views illustrating a manufacturing process of a power storage device.
Figure 3B:
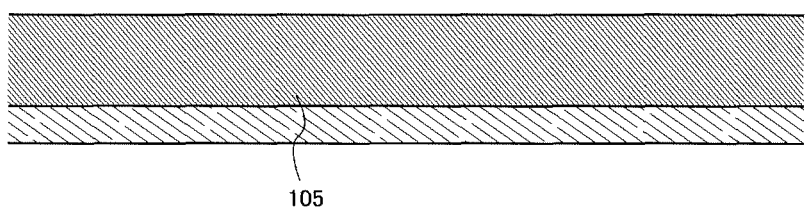

Next, a plate-like negative-electrode active material 105 which is a material of a negative-electrode active material 122 is formed over the negative-electrode current collector 121 (see FIG. 3B).

As the plate-like negative-electrode active material 105, a lithium-ion holding body such as a carbon material, a silicon material, or a silicon alloy material, which is capable of occluding and releasing lithium ions, is used. As such a carbon material, powdered or fibrous graphite or the like can be used. As such a silicon material, a material obtained by depositing microcrystalline silicon and then removing amorphous silicon from the microcrystalline silicon by etching may be used. When amorphous silicon is removed from microcrystalline silicon, the surface area of the remaining microcrystalline silicon is increased. In a lithium-ion capacitor where lithium ions are used as carrier ions, for example, a material obtained by impregnating the aforementioned lithium-ion holding body with metallic lithium may be used. In other words, a material obtained by impregnating the aforementioned carbon material, silicon material, silicon alloy material, or the like with metallic lithium may be used as the negative-electrode active material 122.

Figure 3C:
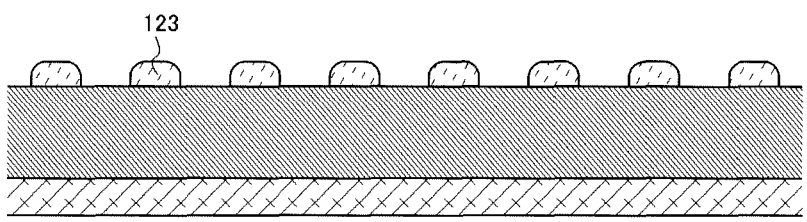

Next, over the plate-like negative-electrode active material 105, a plurality of insulators 123 serving as an etching mask are formed (see FIG. 3C). The insulators 123 may be formed with a material and by a manufacturing method which are similar to those of the insulators 113.

Figure 3D:
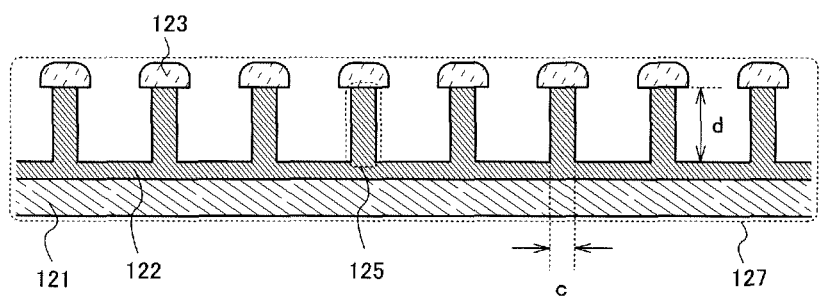

Next, with the use of the insulators 123 as a mask, the plate-like negative-electrode active material 105 which can be etched by dry etching is anisotropically etched by a dry etching method. Accordingly, the negative-electrode active material 122 is formed, which includes a plurality of projections 125 in which a ratio of height d to width c is 3 or more and 1000 or less to 1, i.e. (3 to 1000):1, preferably 10 or more and 1000 or less to 1, i.e. (10 to 1000):1. For example, each of the projections 125 has a width c of 1 μm to 10 μm and a height d of 3 μm to 1000 μm, preferably, a width c of 1 μm to 10 μm and a height d of 10 μm to 100 μm, or a width c of 1 μm and a height d of 10 μm (see FIG. 3D). FIG. 3D is a cross-sectional view, in which the negative-electrode active material 122 is illustrated as having a comb-like shape. However, the projections 125 are also formed in rows behind those illustrated, and thus, the negative-electrode active material 122 has a shape like a pin frog (spikes).

In the case of using a plate-like negative-electrode active material 105 which is difficult to etch by dry etching, the projections 125 may be formed by a different method such as mechanical processing, screen printing, electroplating, or hot embossing. Even in the case of using a plate-like negative-electrode active material 105 which can be etched by dry etching, the projections 125 may be formed by any of these methods. In the above manner, a negative electrode 127 is formed.

Next, the positive electrode 117 and the negative electrode 127 are disposed to face each other, and a separator 131 is provided between the positive electrode 117 and the negative electrode 127.

As the separator 131, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. Note that a material which does not dissolve in an electrolyte 132 mentioned below should be selected.

More specific examples of materials of the separator 131 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, which can be used either alone or in combination.

The separator 131 is interposed between the projections 115 of the positive-electrode active material 112 and the projections 125 of the negative-electrode active material 122 and thus may be broken by application of pressure. However, because the insulators 113 are provided on the projections 115 and the insulators 123 are provided on the projections 125, the insulators 113 and the insulators 123 absorb or suppress pressure and can prevent the separator 131 from being broken. Accordingly, the positive electrode 117 and the negative electrode 127 can be prevented from being in contact with each other and short-circuited.

The electrolyte 132 is provided in a space between the positive electrode 117 and the negative electrode 127. Through the above process, a power storage device 135 is manufactured (see FIG. 1).

The electrolyte 132 contains alkali metal ions as carrier ions, such as lithium ions, and the lithium ions are responsible for electrical conduction. The electrolyte 132 includes a solvent and a lithium salt which dissolves in the solvent. Examples of lithium salts include $LiPF_6$ (lithium hexafluorophosphate), $LiClO_4$, $LiBF_4$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, $LiN(C_2F_5SO_2)$, $LiPF_3(CF_3)_3$, $LiPF_3(C_2F_5)_3$, and the like, which can be used for the electrolyte 132, either alone or in combination.

Note that in the description of this specification, alkali metal ions such as lithium (Li) ions are used as carrier ions; instead of lithium ions, alkali metal ions such as sodium (Na) ions may be used. Furthermore, alkaline earth metal ions such as magnesium (Mg) ions or calcium (Ca) ions may be used.

In the case of manufacturing a capacitor where such carrier ions are used and the negative-electrode active material 122 is impregnated with a metal of the same kind as that of the carrier ions, the aforementioned carbon material, silicon material, silicon alloy material, or the like, which is capable of occluding and releasing the carrier ions, may be impregnated with the metal.

Examples of the solvent of the electrolyte 132 include: cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (hereinafter abbreviated as EMC), methylpropyl carbonate (MPC), methylisobutyl carbonate (MIPC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane; alkyl phosphate esters such as trimethyl phosphate, triethyl phosphate, and trioctyl phosphate and fluorides thereof. These materials can be used either alone or in combination.

The power storage device 135 manufactured in the above manner may be used with a substrate 137 attached to its surface, if necessary (see FIG. 4B). As the substrate 137, a substrate which functions as a sealing layer may be selected, or a substrate which functions as a protector may be selected. Furthermore, a substrate which functions as both a sealing layer and a protector may be selected, or a substrate which functions as a sealing layer and a substrate which functions as a protector may be stacked.

The power storage device 135 may be used in a long plate-like shape, or the power storage device 135 in a long plate-like shape may be rolled into a cylindrical power storage device 138, if necessary (see FIG. 4A). Note that FIG. 4B is a cross-sectional view taken along a line A-A' of FIG. 4A.

This application is based on Japanese Patent Application serial no. 2009-054519 filed with Japan Patent Office on Mar. 9, 2009, the entire contents of which are hereby incorporated by reference.

What is claimed is:

1. A power storage device comprising:
    a positive electrode including:
        a positive-electrode current collector;
        a plurality of first projections on the positive-electrode current collector, the plurality of first projections comprising a positive-electrode active material; and
        a first insulator on an end of each of the plurality of first projections of the positive-electrode active material;
    a negative electrode including:
        a negative-electrode current collector;
        a plurality of second projections on the negative-electrode current collector, the plurality of second projections comprising a negative-electrode active material; and
        a second insulator on an end of each of the plurality of second projections of the negative-electrode active material;
    a separator between the positive electrode and the negative electrode, the plurality of first projections and the plurality of second projections facing each other with the separator therebetween; and
    an electrolyte in a space between the positive electrode and the negative electrode, the electrolyte containing carrier ions.

2. The power storage device according to claim 1, wherein a width of each of the plurality of first projections is smaller than a height of each of the plurality of first projections, and
    wherein a width of each of the plurality of second projections is smaller than a height of each of the plurality of second projections.

3. The power storage device according to claim 2, wherein in each of the plurality of first projections and the plurality of second projections, a ratio of the height to the width is 3 or more and 1000 or less to 1.

4. The power storage device according to claim 1, wherein the positive-electrode current collector comprises any one of aluminum, titanium, and a compound thereof.

5. The power storage device according to claim 1, wherein the positive-electrode active material comprises any one of a metal compound having a layered structure, activated carbon, and a lithium-containing composite oxide.

6. The power storage device according to claim 1, wherein the negative-electrode current collector comprises any one of copper, aluminum, nickel, titanium, and a compound thereof.

7. The power storage device according to claim 1, wherein the
    negative-electrode active material comprises any one of carbon material, silicon material, and silicon alloy material.

8. The power storage device according to claim 1, wherein each of the first insulator and the second insulator comprises at least one of acrylic resin, polyimide resin, polyimide amide resin, phenol resin, epoxy resin, resist, silicon oxide, silicon oxide containing nitrogen, silicon nitride containing oxygen, and silicon nitride.

9. The power storage device according to claim 1, wherein the separator includes any one of cellulose, paper, nonwoven fabric, glass fiber, nylon, polyamide, vinylon, polyester, acrylic, polyolefin, polyurethane, fluorine-based polymer, polyethylene, polypropylene, polyethylene oxide, polypropylene oxide, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and derivatives thereof.

10. The power storage device according to claim 1, wherein a solvent of the electrolyte includes any one of cyclic carbonate, ethylene carbonate, propylene carbonat, butylene carbonate, vinylene carbonate, acyclic carbonate, dimethyl carbonate, diethyl, carbonate, ethylmethyl carbonate, methylpropyl carbonate, methylisobutyl carbonate, dipropyl carbonate, aliphatic carboxylic acid ester, methyl formate, methyl acetate, methyl propionate, ethyl propionate, γ-lactones, γ-butyrolactone, acyclic ether, 1,2-dimethoxyethane, 1,2-diethoxyethane, ethoxymethoxy ethane, cyclic ether, tetrahydrofuran, 2-methyltetrahydrofuran, dimethylsulfoxide, 1,3-dioxolane, alkyl phosphate ester, trimethyl phosphate, triethyl phosphate, and trioctyl phosphate and fluorides thereof.

11. A power storage device comprising:
a first electrode comprising:
  a first-electrode current collector;
  a plurality of first projections in contact with the first-electrode current collector, the plurality of first projections comprising a first-electrode active material; and
  a first insulator on an end of each of the plurality of first projections of the first-electrode active material,
  wherein the first-electrode active material comprises a different material from the first-electrode current collector, and
  wherein the first insulator has a curved upper surface and a flat bottom surface;
a second electrode comprising:
  a second-electrode current collector; and
    a second-electrode active material on the second-electrode current collector;
a separator between the first electrode and the second electrode, the first electrode and the second electrode facing each other; and
an electrolyte in a space between the first electrode and the second electrode, the electrolyte containing carrier ions.

12. The power storage device according to claim 11, wherein a width of each of the plurality of first projections is smaller than a height of each of the plurality of first projections.

13. The power storage device according to claim 12, wherein in each of the plurality of first projections, a ratio of the height to the width is 3 or more and 1000 or less to 1.

14. The power storage device according to claim 11, wherein one of the first-electrode current collector and the second-electrode current collector comprises any one of aluminum, titanium, and a compound thereof.

15. The power storage device according to claim 11, wherein one of the first-electrode current collector and the second-electrode current collector comprises any one of copper, aluminum, nickel, titanium, and a compound thereof.

16. The power storage device according to claim 11, wherein one of the first-electrode active material and the second-electrode active material comprises any one of carbon material, silicon material, and silicon alloy material.

17. The power storage device according to claim 11, wherein the first insulator comprises at least one of acrylic resin, polyimide resin, polyimide amide resin, phenol resin, epoxy resin, resist, silicon oxide, silicon oxide containing nitrogen, silicon nitride containing oxygen, and silicon nitride.

18. The power storage device according to claim 11, wherein the separator comprises any one of cellulose, paper, nonwoven fabric, glass fiber, nylon, polyamide, vinylon, polyester, acrylic, polyolefin, polyurethane, fluorine-based polymer, polyethylene, polypropylene, polyethylene oxide, polypropylene oxide, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and derivatives thereof.

19. The power storage device according to claim 11, wherein a solvent of the electrolyte comprises any one of cyclic carbonate, ethylene carbonate, propylene carbonat, butylene carbonate, vinylene carbonate, acyclic carbonate, dimethyl carbonate, diethyl carbonate, ethylmethyl carbonate, methylpropyl carbonate, methylisobutyl carbonate, dipropyl carbonate, aliphatic carboxylic acid ester, methyl formate, methyl acetate, methyl propionate, ethyl propionate, γ-lactones, γ-butyrolactone, acyclic ether, 1,2-dimethoxyethane, 1,2-diethoxyethane, ethoxymethoxy ethane, cyclic ether, tetrahydrofuran, 2-methyltetrahydrofuran, dimethylsulfoxide, 1,3-dioxolane, alkyl phosphate ester, trimethyl phosphate, triethyl phosphate, and trioctyl phosphate and fluorides thereof.

20. The power storage device according to claim 11, wherein at least one of the first-electrode current collector and the second-electrode current collector has a flat upper surface.

21. The power storage device according to claim 11, wherein the separator is in contact with the first insulator.

22. The power storage device according to claim 11, wherein the second-electrode active material comprises a plurality of second projections in contact with the second-electrode current collector.

* * * * *